Nov. 28, 1961 C. A. PARLANTI 3,010,398
COMPOSITE NOSE CONE STRUCTURE
Filed Oct. 15, 1957 2 Sheets-Sheet 1

INVENTOR.
CONRAD ANTHONY PARLANTI
BY
ATTORNEYS.

Nov. 28, 1961 — C. A. PARLANTI — 3,010,398
COMPOSITE NOSE CONE STRUCTURE
Filed Oct. 15, 1957 — 2 Sheets-Sheet 2

INVENTOR.
CONRAD ANTHONY PARLANTI
BY
ATTORNEYS.

United States Patent Office 3,010,398
Patented Nov. 28, 1961

3,010,398
COMPOSITE NOSE CONE STRUCTURE
Conrad Anthony Parlanti, 11 Bradford Road,
Natick, Mass.
Filed Oct. 15, 1957, Ser. No. 690,390
10 Claims. (Cl. 102—92.5)

This invention relates to composite metallic structure adapted to be used in the construction of missiles, rockets, aircraft and other objects which are intended to move through the earth's atmosphere at extremely high speeds. Such composite metallic structures may be used, for example, in the construction of those portions of missiles, rockets, aircraft and the like where the generation of heat due to atmospheric friction is most likely to occur, such as nose cones, and the leading edges of wings, fins and the like. Engineering calculations and tests and experiments have indicated that ordinary materials and structures cannot successfully withstand the stresses of pressure and heat generated by friction at the extremely high speeds at which such objects are designed to travel. In the aircraft field, for example, at speeds of Mach 6 and above, the temperatures generated by friction along the leading edges of wings are so high that even special heat resistant steels become distorted thereby. In the missile field, in order to guard against such difficulties, the requirements of a ballistic missile now under development are for a nose cone capable of withstanding a load of 150,000 lbs. per sq. in. at a temperature of 1450° F.

It is an object of the present invention to provide a structure capable of withstanding such extreme conditions and of satisfying such exacting requirements.

Other objects and advantages of the invention will appear hereinafter.

A preferred embodiment of the invention selected for purposes of illustration is shown in the accompanying drawings, in which, FIGURE 1 is a plan view of a nose cone embodying the invention.

Figure 1:
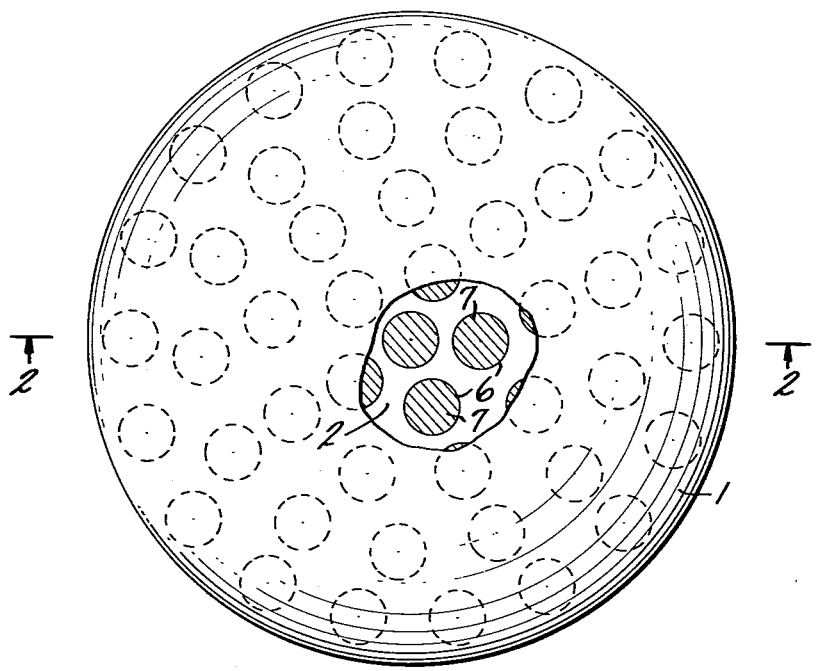
Figure 2:
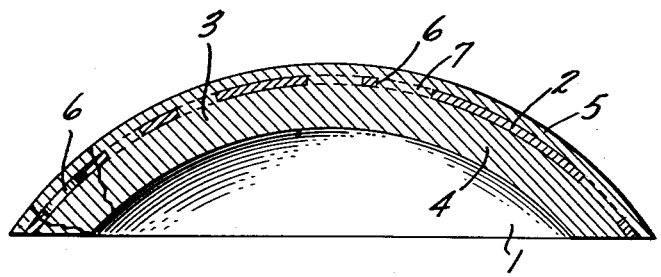
FIGURE 2 is a section on the line 2—2 of FIGURE 1.

Referring to FIGURES 1 and 2 of the drawings, the nose cone 1 therein illustrated comprises a shell which, in the preferred embodiment illustrated, has a convex outer surface and a concave inner surface. As illustrated, the shell is generally circular in transverse cross section. It will be understood, however, that the nose shape illustrated is merely exemplary and that nose cones according to the present invention may be made in various shapes and sizes other than that illustrated herein.

The shell, as seen in FIGURE 2, comprises an inner core 2 of steel adapted to give the completed cone adequate structural strength to sustain the required pressures, which said steel core is entirely encased within a thicker shell 3 of aluminum or aluminum alloy in which aluminum is the major constituent having a high coefficient of thermal conductivity. The steel core is preferably located in such manner that the thickness of the aluminum layer 4 lying inside the steel core is substantially greater than the thickness of the aluminum layer 5 lying outside the steel core. In the embodiment shown in FIGURES 1 and 2, the thickness of the inner layer 4 is approximately four times the thickness of the outer layer 5. Preferably, the thickness of the inner layer 4 should not be less than twice nor more than six times the thickness of the outer layer 5. In use, the exposed surface of the layer 5 is a heat absorbing surface, while the exposed surface of the layer 4 is a heat dissipating surface. Preferably each of the aluminum layers 4 and 5 is thicker than the steel core.

The steel core is provided with a plurality of apertures 6 distributed throughout its area through which heat may be transmitted rapidly from the outer layer 5 of aluminum to the inner layer 4. In the manufacture of the cone, the steel core is formed first, preferably by casting. Apertures 6 are then drilled through the core at appropriate intervals distributed over the surfaces of the steel core. The aluminum shell is then cast over the steel core with the layers 4 and 5 in contact with the inner and outer surfaces of the steel core, and with integral connecting necks 7 of aluminum extending through the apertures 6 and connecting the inner and outer layers of aluminum. The total of the areas of the apertures 6 should preferably be at least 30% of the area of the outside surface of the shell in order to provide sufficiently rapid conduction of heat from the outer layer 5 to the inner layer 4. Preferably, however, the total area of the apertures 6 should not exceed 40% of the area of the outside surface of the shell if excessive weakening of the steel shell is to be avoided.

In using such nose cones, the heat which is generated at the outer exposed surface of the cone due to friction with the atmosphere penetrates quickly into the aluminum layer 5 and is then transmitted by the connecting necks 7 into the inner layer 4 where it may be removed by suitable known expedients such as cooling fins, refrigeration and the like. Some heat is also transmitted from layer 5 to layer 4 directly through the steel core, but the thermal conductivity of steel is so low that this heat transfer is entirely inadequate without the assistance of the more rapid heat transfer through the connecting necks 7. The size and distribution of the apertures 6 will depend on the quantity of heat which is required to be transferred and dissipated under given conditions. Also, the shape of the apertures may be varied as required. For example, they may be square, rectangular, or may take the form of elongated slots.

As a specific example of a nose cone made according to the present invention for test purposes, a steel core of substantially the shape shown in the drawings, and having a diameter of approximately 12" and wall thickness of approximately .237" was first formed from alloy steel of approximately the following composition known as "AISI Spec. 4340."

| | Percent |
|---|---|
| Carbon | 0.41 |
| Manganese | 0.72 |
| Phosphorus | 0.016 |
| Sulphur | 0.019 |
| Silicon | 0.30 |
| Nickel | 1.85 |
| Chromium | 0.74 |
| Molybdenum | 0.25 |

A series of apertures were then drilled through the wall of the steel core, said apertures being approximately 1" in diameter. The casting was then heat treated to a Rockwell C of 40. Said apertures were distributed at intervals over the surface of the steel core, the spacing between centers of adjacent apertures being approximately as illustrated. The total area of the apertures 6 was approximately 37% of the area of the outside heat absorbing surface of the shell.

The steel core was then placed in a suitable casting mold and supported therein in the manner of a core. Molten aluminum was then poured into the mold to form the inside and outside layers 4 and 5 and the connecting necks 7. In this specific example, the aluminum was an alloy of the following composition:

|  | Percent |
|---|---|
| Copper | 0.5 to 1.3 |
| Magnesium | 0.8 to 1.5 |
| Silicon | 11.0 to 13.0 |
| Manganese | 0.5 |
| Iron | 0.8 |
| Nickel | 2.0 to 3.0 |
| Zinc | 0.1 |
| Lead | 0.1 |
| Tin | 0.1 |
| Aluminum | Remainder |

The casting was then heat treated for eight hours at 525° C. and then for sixteen hours at 160° C.

After the cone was removed from the mold, the outside and inside surfaces were machined. In this specific example the thickness of the outer aluminum layer was approximately .4" and the thickness of the inner layer was approximately 1.6" so that the total thickness of the cone was approximately 2.237".

Figure 3:
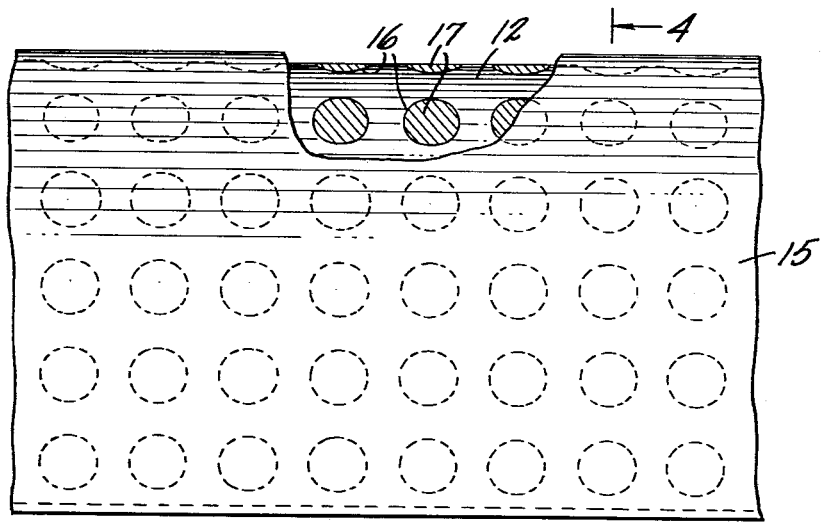
FIGURE 3 is a plan view of an aircraft wing component embodying the invention.
Figure 4:
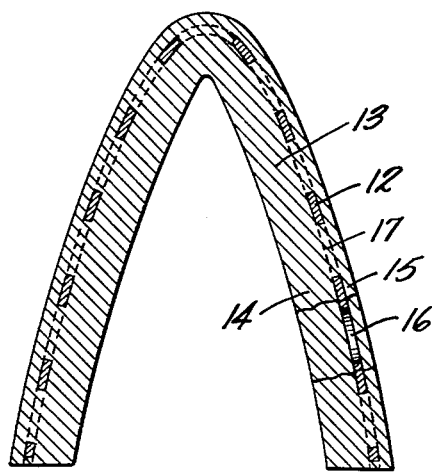
FIGURE 4 is a section on the line 4—4 of FIGURE 3.

In FIGURES 3 and 4, the invention is illustrated as applied to a wing component adapted for use at the leading edge of a wing, fin or the like. In this case the component comprises an elongated hollow shell which is V-shaped in cross section and extends lengthwise any desired distance.

The shell, as seen in FIGURE 4, again comprises an inner core 12 of steel adapted to provide adequate structural strength, which said core is entirely encased within a thicker shell 13 of aluminum or aluminum alloy having a high coefficient of thermal conductivity. As before, the steel core is preferably located between the inner and outer surfaces of the aluminum shell in such manner that the thickness of the aluminum layer 14 lying inside of the steel core is approximately two to six times the thickness of the outside layer 15, the thickness of the layer 15 being slightly greater than the thickness of the steel shell. The steel core is also provided with a plurality of apertures 16 distributed throughout its area, through which the integral connecting necks 17 extend to facilitate heat transfer from the outer aluminum layer 15 to the inner layer 14. The process of manufacturing such components is substantially as previously described.

Heretofore, in making nose cones and wing components for missiles and the like, the exterior surface in many instances has been given a thin coating of silver or gold and the surface of this coating has been highly polished to reduce frictional resistance and also to increase the reflectivity of the surface.

According to the present invention, however, I prefer to anodize the outer surface of the outside layer of aluminum. The anodized surface can not only be made as smooth and frictionless as polished silver or gold, but its reflectivity is superior to polished silver or gold. Moreover, the anodized surface is extremely hard and resistant to abrasion. Because of the very high degree of reflectivity, an increased quantity of heat is dissipated from the surface by radiation.

In addition, I prefer to anodize the outer surface of the interior layer of aluminum. Again, because of the high degree of reflectivity of the anodized surface, an increased quantity of heat is dissipated from the surface by radiation.

It will be understood that the invention may be variously modified and embodied within the scope of the subjoined claims.

I claim as my invention:

1. A nose cone and leading edge structure for supersonic missiles and aircraft, comprising a steel core encased within an aluminum shell having an outside heat absorbing surface and an inside heat dissipating surface, said shell having a layer of aluminum covering each face of the steel core, the thickness of the inner layer of aluminum being substantially greater than that of the outer layer, said steel core having a series of apertures formed therein at intervals distributed over the surfaces of the steel core, and said aluminum shell having integral necks extending through said apertures and connecting said aluminum layers.

2. A structure according to claim 1 in which the heat absorbing surface of said shell is anodized.

3. A structure according to claim 1 in which the heat dissipating surface of said shell is anodized.

4. A structure according to claim 1 in which both the heat absorbing surface and the heat dissipating surface of said shell are anodized.

5. A structure according to claim 1 in which the thickness of the inner layer of aluminum is more than twice the thickness of the outer layer of aluminum.

6. A structure according to claim 1 in which the thickness of the inner layer of aluminum is more than twice and less than six times the thickness of the outer layer of aluminum.

7. A structure according to claim 1 in which the total of the areas of said apertures is not less than 30% of the area of the outside heat absorbing surface of said shell.

8. A structure according to claim 1 in which the total of the areas of said apertures is not more than 40% of the area of the outside heat absorbing surface of said shell.

9. A structure according to claim 1 in which the total of the areas of said apertures is not less than 30% nor more than 40% of the area of the outside heat absorbing surface of said shell.

10. A structure according to claim 1 in which the thickness of the inner layer of aluminum is more than twice the thickness of the outer layer of aluminum and in which the total of the areas of said apertures is not less than 30% of the area of the outside heat absorbing surface of said shell.

References Cited in the file of this patent

UNITED STATES PATENTS

| 312,485 | Makin | Feb. 17, 1885 |
| 1,132,902 | Bauer | Mar. 23, 1915 |
| 2,404,904 | Collins | July 30, 1946 |
| 2,499,944 | Brace et al. | Mar. 7, 1950 |
| 2,544,670 | Grange et al. | Mar. 13, 1951 |
| 2,692,851 | Burrows | Oct. 26, 1954 |